United States Patent
Dittfeld et al.

(10) Patent No.: US 8,456,794 B2
(45) Date of Patent: Jun. 4, 2013

(54) CLOCK-PULSED SAFETY SWITCH

(75) Inventors: Timo Dittfeld, Munich (DE); Dirk Hammerschmidt, Villach (AT)

(73) Assignee: Infineon Technologies AG, Neubiberg (DE)

( * ) Notice: Subject to any disclaimer, the term of this patent is extended or adjusted under 35 U.S.C. 154(b) by 338 days.

(21) Appl. No.: 12/617,279

(22) Filed: Nov. 12, 2009

(65) Prior Publication Data
US 2011/0110011 A1    May 12, 2011

(51) Int. Cl.
*F23Q 3/00* (2006.01)
(52) U.S. Cl.
USPC .......................................... 361/248; 361/247
(58) Field of Classification Search
USPC ........................... 361/18, 93.7–93.9, 247, 248
See application file for complete search history.

(56) References Cited

U.S. PATENT DOCUMENTS

| | | | | |
|---|---|---|---|---|
| 4,992,683 A | * | 2/1991 | Robin, Jr. | 327/432 |
| 5,359,244 A | * | 10/1994 | Hopkins | 327/434 |
| 2008/0258787 A1 | * | 10/2008 | Takahashi et al. | 327/175 |

FOREIGN PATENT DOCUMENTS

DE    102004030222    2/2005

OTHER PUBLICATIONS

"Smart High-Side Power Switch PROFET® One Channel," BTS50090-1TMB, Automotive Power, Datasheet, Infineon, Rev. 10, Feb. 11, 2008, 27 pages.

* cited by examiner

*Primary Examiner* — Danny Nguyen
(74) *Attorney, Agent, or Firm* — Slater & Matsil, L.L.P.

(57) ABSTRACT

In accordance with an embodiment, a high-side switch device includes a semiconductor switch, a charge pump operable external clocking signal and an input for an external charge pump activation signal. The charge pump is configured to enable conductivity of the semiconductor switch in response to the external clocking signal and assertion of the external charge pump activation signal.

32 Claims, 8 Drawing Sheets

CLOCK-PULSED SAFETY SWITCH

TECHNICAL FIELD

An embodiment of the invention relates generally to an actuator switch for a safety-related function, for example, an automotive airbag squib, and a related method.

BACKGROUND

Applications that include electronic means to provide a safety-related function typically require a high safety integrity level ("SIL") to prevent accidental initiation of the safety-related function. For example, an airbag in an automobile requires a high SIL to prevent unwanted airbag inflation, which by itself presents its own safety-related issues for an occupant of the automobile as well as substantial cost for its replacement. A signal to initiate an airbag firing squib should be confirmed by at least two independent instances that detect a need for the actuator action. The resulting architecture is called a one out of two, which means that one out of two systems may fail without initiating a dangerous event.

In systems such as airbag squib firing systems, an electronic control unit ("ECU") such as a microcontroller is generally employed to process signals from at least two independent acceleration sensors to initiate the actuator action. However, there are functions on an ECU such as a power supply biasing function that are shared by multiple devices on the ECU. If a shared power supply biasing function that supplies a subsystem A and a subsystem B on the ECU produces an overvoltage condition, both subsystems may fail at once, thereby compromising the independence of these subsystems. One solution is to employ multiple power supplies that provide power for independent functions on multiple chips.

Providing independent signal processing elements in a cost-effective manner for a safety-related application such as an airbag squib firing arrangement is a key success factor for such systems in the marketplace. Present system designs address this need with complex signal-processing arrangements with attendant cost. The design of an improved arrangement to provide independent signal processing paths would address an unresolved application need.

SUMMARY OF THE INVENTION

In accordance with an exemplary embodiment, a high-side switch device includes a semiconductor switch and a charge pump operable in response to an external clocking signal. An input is provided for an external charge pump activation signal. The charge pump is configured to enable conductivity of the semiconductor switch in response to the external clocking signal and assertion of the external charge pump activation signal.

BRIEF DESCRIPTION OF THE DRAWINGS

The details of one or more embodiments of the invention are set forth in the accompanying drawings and the description below. Other features, objects, and advantages of the invention will be apparent from the description and drawings, and from the claims. In the figures, identical reference symbols generally designate the same component parts throughout the various views, and may be described only once in the interest of brevity. For a more complete understanding of the invention, reference is now made to the following descriptions taken in conjunction with the accompanying drawings, in which:

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to exemplary embodiments in a specific context, namely a process and method to provide an actuator switch for an airbag squib in an automotive or other transportation-related environment.

An embodiment of the invention may also be applied to other safety-related arrangements, for example, to a detonator in a mining operation. Further safety-related arrangements can be constructed and applied using processes introduced herein in different contexts using inventive concepts described herein, for example, for deployment of a safety flotation raft in an aircraft.

In a safety-related application, a switch that can be controlled by at least two independent low voltage signals is generally required for initiating operation of an actuator. The switch, such as a power field-effect transistor ("FET") or a plurality of switches coupled in a bridge configuration, is coupled between the actuator and a power source. To prevent unintended operation of the actuator, the switch should not be accidentally turned on by a common circuit condition that may induce a failure in a control device of the safety-related system. For example, an ECU may be employed to process signals from multiple independent sensors, such as two or more independent accelerometers, and a failure of the ECU should not enable accidental operation of the actuator. The safety-related system should be realized in a cost-efficient technology that is able to withstand an accidental high input voltage, such as a high input bias voltage, and should not require a highly integrated component for its construction that may provide a common failure mechanism for the independent sensor signals. Further, the safety-related system should "fail safe," for example, it should not initiate an actuator action in the presence of a dc voltage signal that may be produced due to a failure of the control device.

Figure 1:
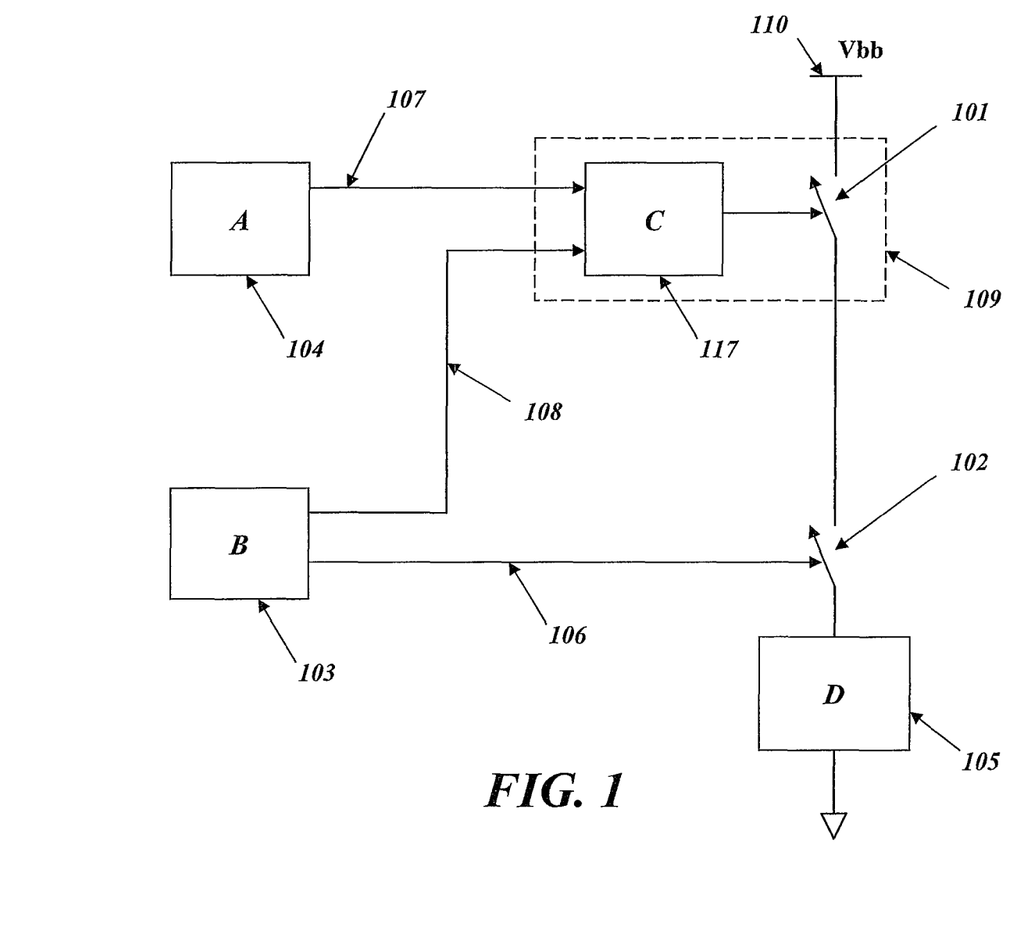
FIG. 1 illustrates a block diagram of a conventional actuator system formed with a series circuit arrangement of a safety switch and a main switch coupled between a power source 110 and an actuator.

Turning now to FIG. 1, illustrated is a block diagram of a conventional actuator system formed with a series circuit arrangement of a safety switch 101 and a main switch 102 coupled between a power source 110 and an actuator D, 105. A main electronic control unit B, 103, is formed with a first sensor and a first signal generator that produces a main signal 106 that closes the main switch 102. The main electronic control unit B also produces a confirmation signal 108 that is transmitted to the safety switch 101. The main electronic control unit B may be formed with a microcontroller that produces the main signal 106 and the confirmation signal 108 in response to the signal from the first sensor. A safety electronic control unit A, 104, is formed with a second sensor and a second signal generator that produces an arming signal 107 that is also transmitted to the safety switch 101. The safety electronic control unit A may also be formed with a microcontroller, typically a microcontroller with a lower level of complexity then the microcontroller that produces the main signal 106. The microcontroller in the safety electronic control unit A 104 is formed on a different piece of silicon than that on which the main electronic control unit B 103 microcontroller is formed. The safety switch 101 is also conventionally formed on a separate die from the main switch 102.

A safety switch control unit C, 117, is interposed between the arming signal 107 and the confirmation signal 108 and the safety switch 101. The safety switch control unit C, 117, enables closure of the safety switch 101 only if both the arming signal 107 and the confirmation signal 108 are present.

Thus, the circuit illustrated in FIG. 1 is formed with two microcontrollers to provide a structure to eliminate a common failure mechanism. Ideally, the two microcontrollers should be powered by bias voltages produced by separate and independent power supplies to eliminate another common failure mechanism.

The safety switch 101 is typically formed as an NMOS field-effect transistor. The signals produced by the main electronic control unit B and the safety electronic control unit A are typically logic-level digital signals, such as 3.3 V or 5 V logic signals. Since the safety switch 101 is a high-side switch, i.e., it does not have a grounded source terminal, a high-level signal is required to drive its gate. Such a high-level signal can be produced by a charge pump formed on a silicon die with high-voltage signal-processing capability, such as capability to produce a gate-drive signal at a voltage level higher than the bias voltage Vbb provided by the power source 110.

Figure 2:
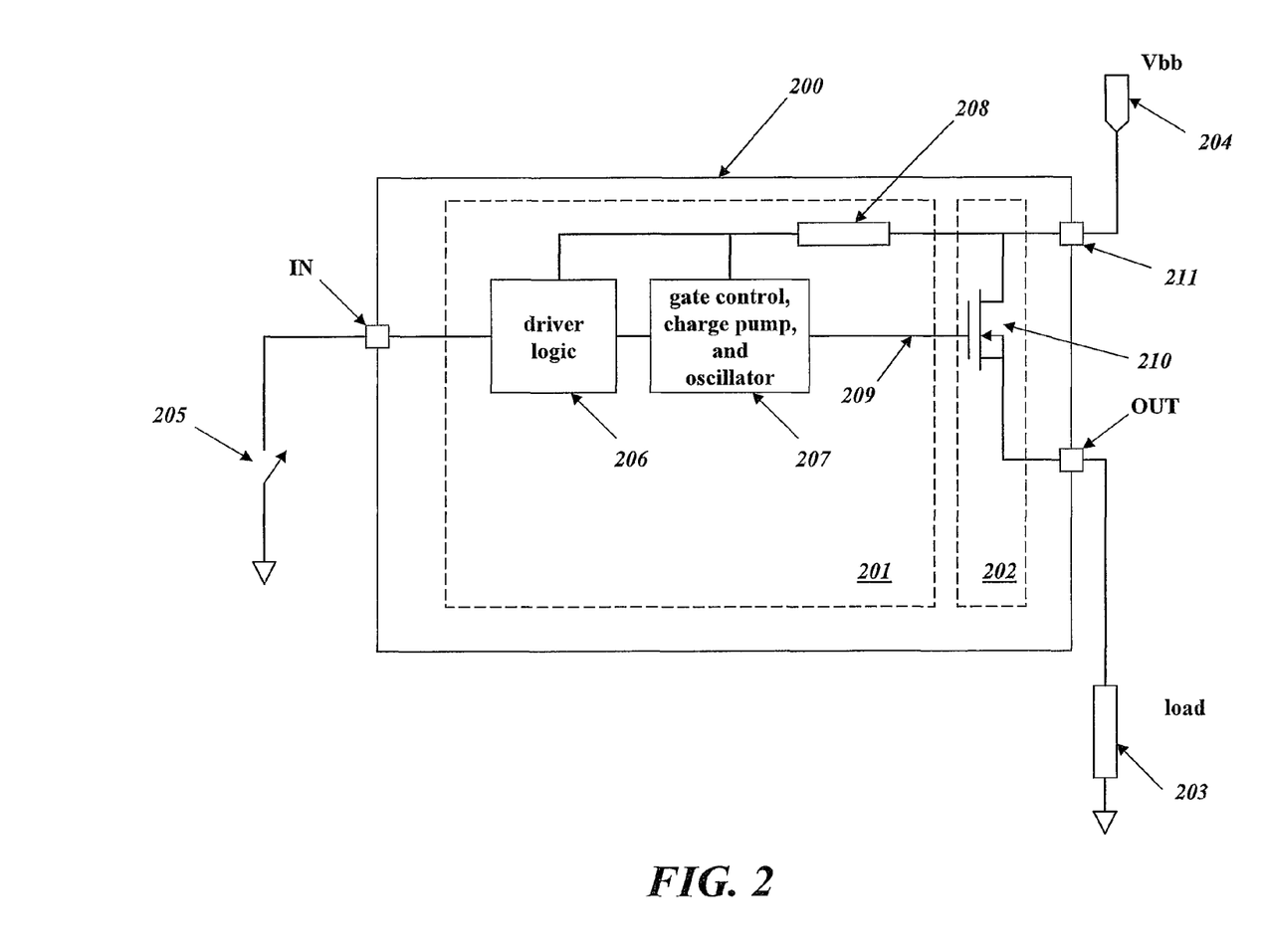
FIG. 2 illustrates a simplified circuit diagram of a portion of an Infineon PROFET® as an example of an integrated, high-side NMOS power MOSFET responsive to a dc ground-referenced logic-level input signal.

Turning now to FIG. 2, illustrated is a simplified circuit diagram of a portion of an Infineon PROFET®, which is an example of an integrated, high-side NMOS power MOSFET responsive to a dc ground-referenced logic-level input signal. In particular, the logic-level input signal grounds the PROFET® input to enable conduction of the power MOSFET, and leaves the input ungrounded to disable conduction of the power MOSFET. Thus, a high-side switch can be turned on by activating a pull-down switch at the low side, which can be done with an open-drain microcontroller output pin. An Infineon PROFET® includes a charge pump coupled to an internal oscillator to produce an internal bias voltage that enables the gate of the power MOSFET to be driven at a voltage level higher than the input bias voltage Vbb. A more complete description of an Infineon PROFET® is provided in the datasheet entitled "BTS50090-1TMB Smart High-Side Power Switch," dated February 2008, which is hereby incorporated herein by reference.

Figure 3:
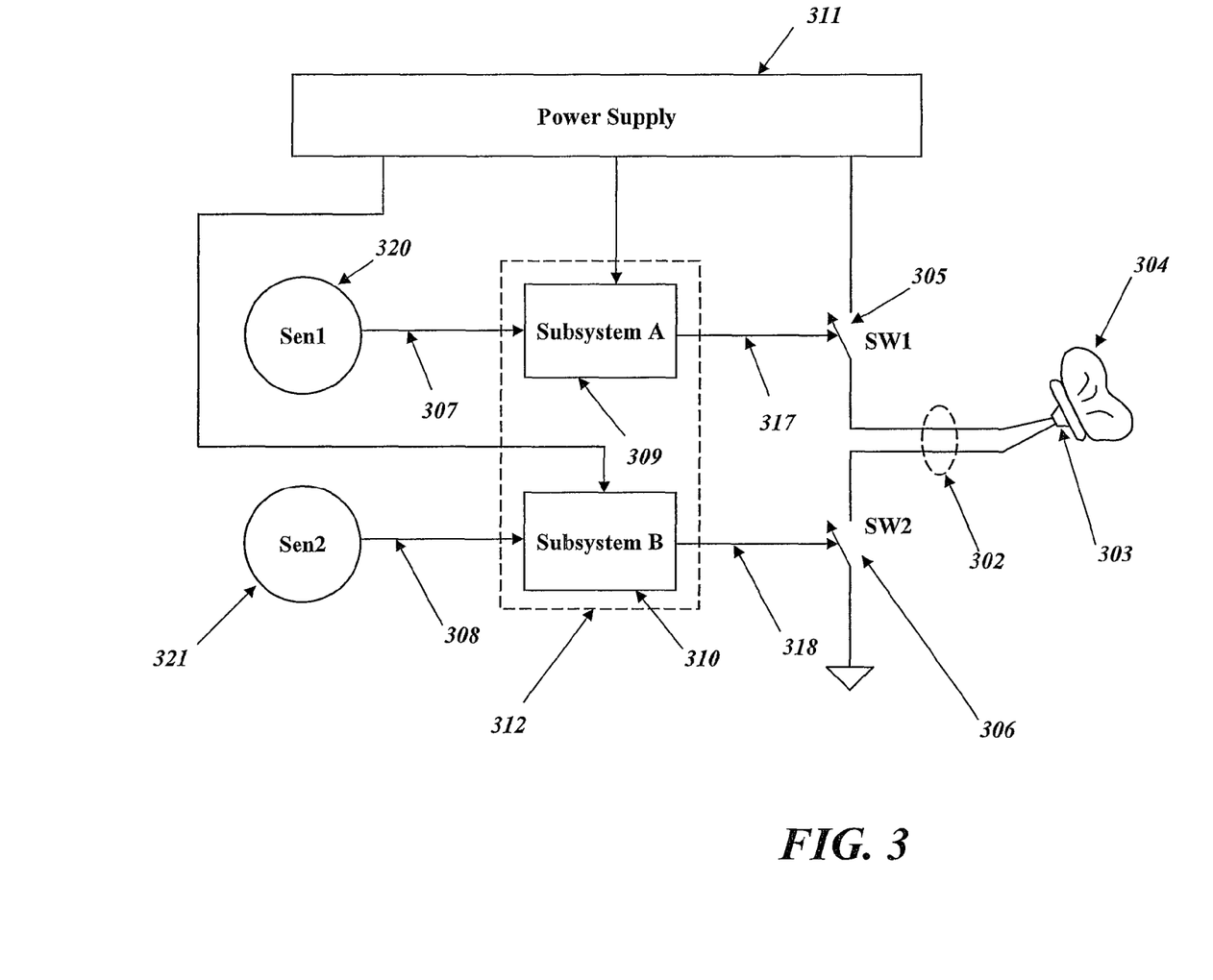
FIG. 3 illustrates a block diagram of an automotive airbag actuator system that can be constructed with a microcontroller coupled to two independent acceleration sensors, to provide an environment for application of the principles of the invention.

Turning now to FIG. 3, illustrated is a block diagram of an automotive airbag actuator system that can be constructed with a microcontroller 312 coupled to acceleration sensors Sen1, 320, and Sen2, 321, to provide an environment for application of the principles of the invention. The microcontroller 312 is coupled to a series circuit arrangement of switches 305 and 306 that in turn are coupled to airbag squib 303 over cable 302 to inflate airbag 304. For the airbag actuator system illustrated in FIG. 3 which requires a high SIL, the initiation of the actuator action, i.e., firing of the squib 303, is confirmed by two decision paths, namely the safety path 307 and the main path 308.

The decision paths 307 and 308 are nominally separated from each other, and the squib 303 can only be fired if the high-side switch 305 is activated by arming signal 317 produced by Subsystem A, 309, and the low-side switch 306 is activated by firing signal 318 produced by Subsystem B, 310. As long as these systems are truly independent, the failure probabilities for each of the subsystems are multiplied to obtain the failure probability of the combined system, and the overall result is low failure probability. However, as illustrated in FIG. 3, Subsystem A, 309, and Subsystem B, 310, are embodied in a common microcontroller 312. Thus, there are functions performed by the microcontroller 312 that are shared by multiple devices such as the power supply 311 in the present one-out-of-two example. If the power supply 311 supplies both Subsystem A and Subsystem B and produces an overvoltage condition, both Subsystem A and Subsystem B may fail at once, possibly incorrectly firing the squib 303. This would be described by a common cause failure factor in a failure analysis.

It is noted that in a typical arrangement, Subsystem A, 309, and Subsystem B, 310, are not embodied in a common microcontroller. The main algorithm is often executed in the main microcontroller and the safing algorithm is executed in a safing microcontroller. The safing microcontroller may be integrated on the same silicon as the main switches, while the main microcontroller will typically be stand-alone. Further, the power supply of both controllers is also typically integrated on the same silicon as the main switches and the main output stages.

Figure 4:
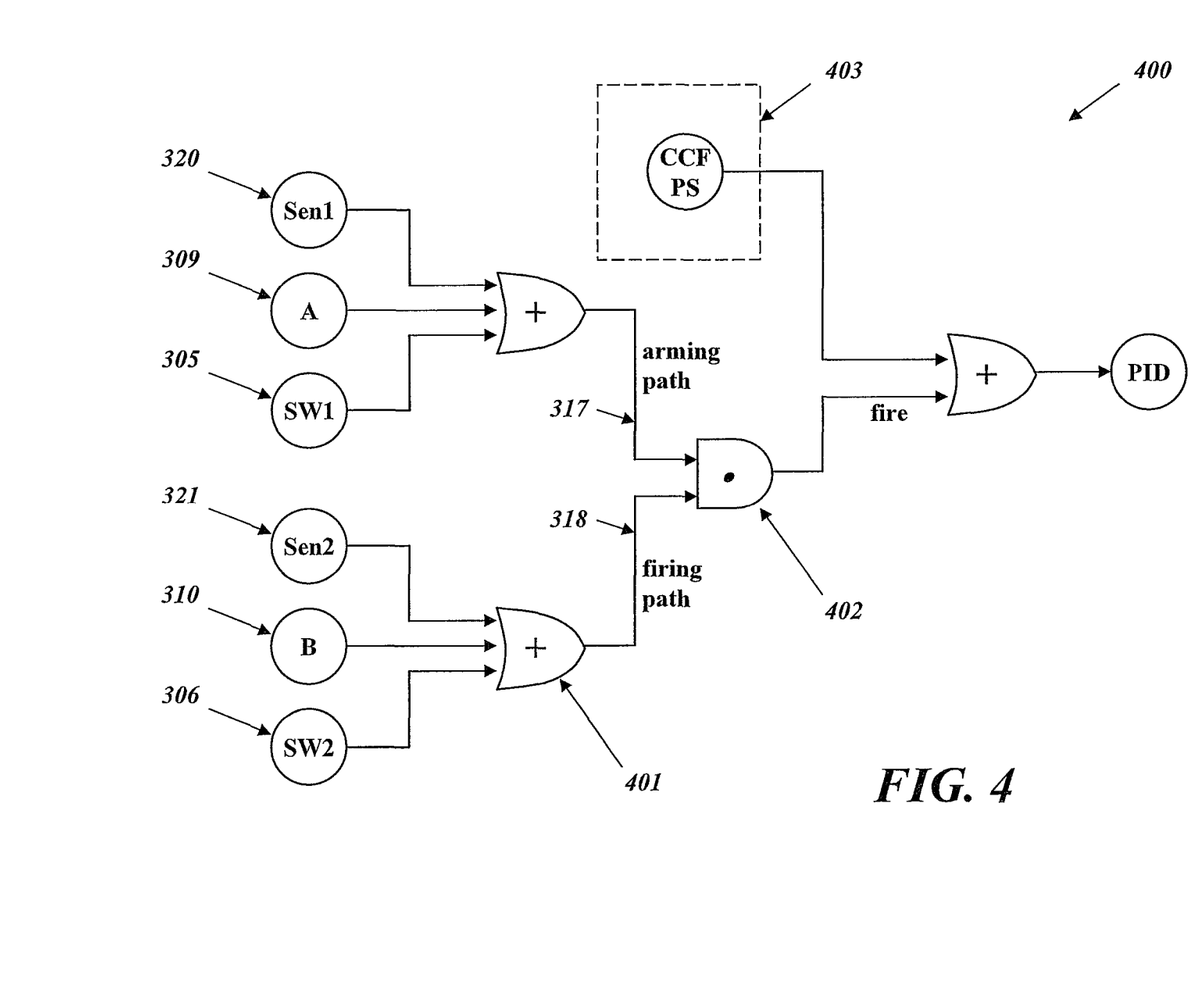
FIG. 4 illustrates a failure tree logic diagram representing a failure analysis of the airbag actuator system illustrated in FIG. 3.

Turning now to FIG. 4, illustrated is a failure tree logic diagram 400 representing a failure analysis of the airbag actuator system illustrated in FIG. 3. The logic diagram in FIG. 4 includes OR gates, such as OR gate 401, and AND gate 402 to represent a probability calculation to produce the probability of an incorrect decision, "PID." Structures illustrated in FIG. 3 are reproduced in FIG. 4, wherein the structures Subsystem A, 309, and Subsystem B, 310, are now abbreviated in FIG. 4 simply as "A" and "B."

A common cause factor, i.e., the common cause factor 403 ("CCF PS") related to the common use of the power supply 311 illustrated in FIG. 3 is included in the logic diagram illustrated in FIG. 4. The associated failure probability is added (as represented by OR gate 404) to the output of AND gate 402 that delivers the multiplied failure probabilities of the "arming" path 317 and the "firing" path 318. A common cause factor is typically a dominant effect in a failure analysis. As introduced herein, such a common cause factor is controlled by measures that prevent the top-level failure event. For the case of a power supply, this could be a limitation of the energy that can be supplied to one of the paths. However, cost pressures push even safety-critical systems towards highly integrated implementations. These pressures are forcing integration of parts belonging to different subsystems onto a single chip, which can introduce a common cause factor. Thus, it is desirable to reduce or otherwise eliminate the probability of erroneous activation of the airbag squib associated with the power supply common cause factor 403.

Figure 5:
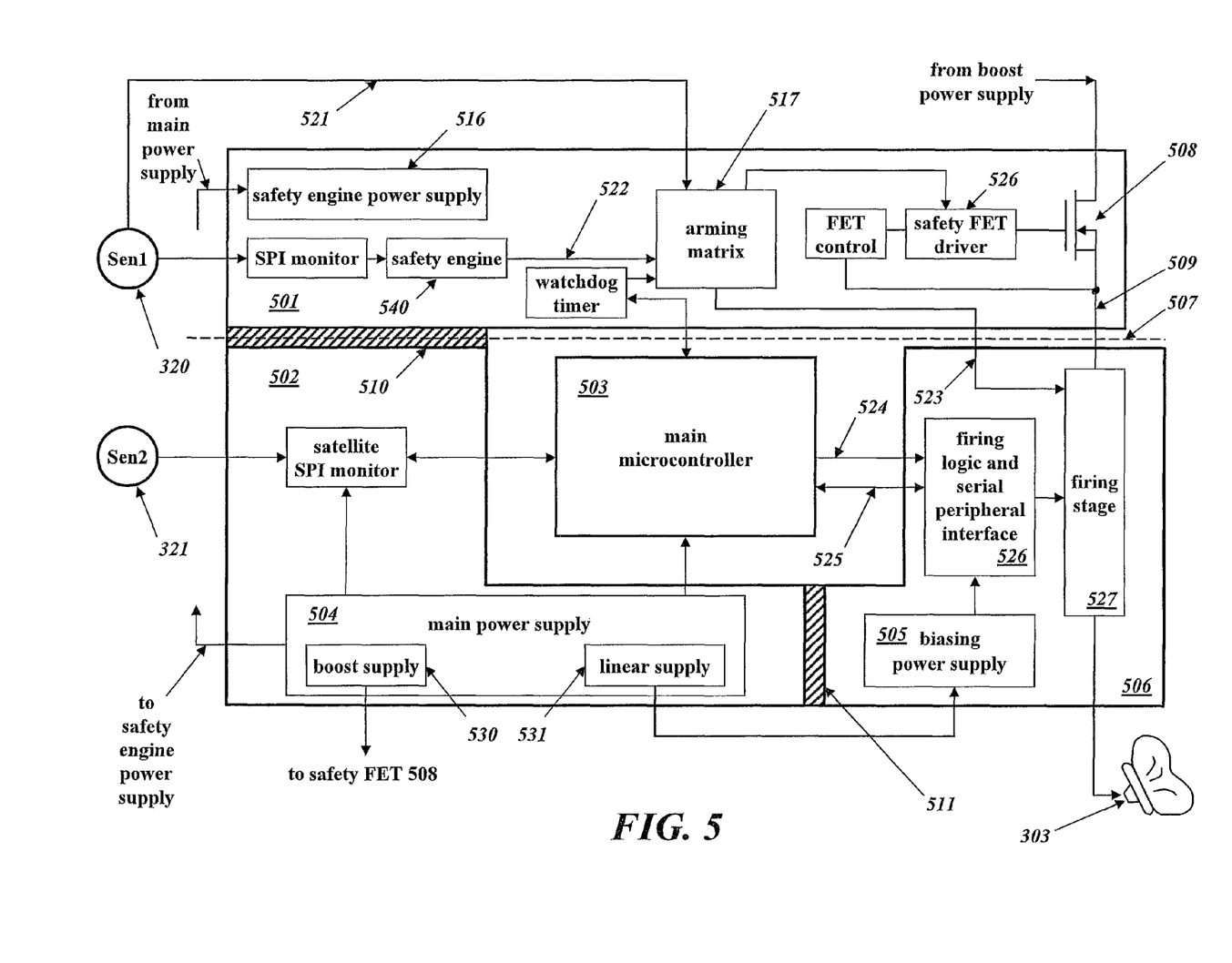
FIG. 5 illustrates a block diagram of an airbag actuator system formed with several silicon devices to provide an environment for application of the principles of the invention.

Turning now to FIG. 5, illustrated is a block diagram of an airbag actuator system formed with several silicon devices, to provide an environment for application of the principles of the invention. One silicon device is a partitioned application-specific integrated circuit ("ASIC") formed with partitions 501, 502, and 506 wherein a separation distance is provided between critical blocks. The airbag actuator system further includes main microcontroller 503 formed on a separate silicon chip. The safety power switch, FET 508, is formed in the partition 501. The main microcontroller 503 performs the principal firing computation for the airbag squib 303.

The airbag squib firing system illustrated in FIG. 5 is powered by a common main power supply 504 that supplies a boost bias voltage to safety FET 508 from an internal boost supply 530, and a low bias voltage coupled to biasing power supply 505 from an internal linear supply 531. The common main power supply 504 also supplies a bias voltage to the main microcontroller 503.

The ASIC partition 501 of the integrated circuit includes a safety engine power supply 516, and also includes a serial peripheral interface ("SPI") that receives a serial digital signal from sensor Sen1 that is coupled to safety engine 540 that produces main arming signal 522. The safety engine 540 is a second microcontroller that is integrated on the IC partition 501 on which the safety FET 508 is formed. Thus, the safety engine 540 is not an independent silicon device in the safety path. The main arming signal 522 is coupled to arming matrix 517 that performs the basic arming computation for the airbag squib 303. The arming matrix 517 also receives a pre-arming signal 521 from sensor Sen1. The arming matrix 517 transmits an enable signal to safety FET driver 526 that in turn is coupled to the gate of safety FET 508. The safety FET driver 526 includes a charge pump and an oscillator capable of producing a gate-drive voltage for the safety FET 508 that is higher than the bias voltage produced by the boost supply 530. The partition 501 also includes a watchdog timer that is employed to validate normal operation of the arming matrix 517, and to report a malfunction to main microcontroller 503.

The ASIC partition 502 of the integrated circuit receives a serial digital signal from sensor Sen2 in a satellite SPI monitoring block that is transmitted to the main microcontroller 503. The ASIC partition 502 is powered by main power supply 504.

The ASIC partition 506 of the integrated circuit includes a firing logic and serial peripheral interface block 526 that communicates with the main microcontroller 503 over line 525 and receives a firing signal from the main microcontroller 503 over line 524. The firing logic and serial peripheral interface block 526 transmits a firing signal to firing stage 527 that includes a main switch and a safety switch such as the main switch and safety switch described previously hereinabove with reference to FIGS. 1 and 3. Thus, the circuit illustrated in FIG. 5 provides a high level of separation of main and safety firing paths, but nonetheless includes a common cause factor related to the power supply. A squib-firing signal produced by a failure of the integrated circuit including partitions 501, 502, and 506 illustrated in FIG. 5 cannot be blocked by the microcontroller 503.

A second common cause is given by realization of the safety path (excluding the safety switch and the associated sensor) on the same die as the power supply, interfaces, and firing stage of the main path. The ASIC provides separation measures such as spacing and trench isolation between those blocks, but there is a further common cause factor. Therefore an independent piece of silicon such as the safety switch should be realized and controlled in a manner that it is not influenced by the main power IC.

To reduce common cause factors for unintended operation of an airbag actuator, a limited measure of separation of the channels at a power switching level is achieved by including the additional serial switch in the airbag firing circuit, represented in FIG. 5 by the safety FET 508. Such an additional serial switch, which can also be realized by an external high-side MOSFET, may be a central switch employed to protect multiple squibs. Typically the high-side additional switch is an NDMOS device that must be driven by a high-voltage driver to provide a gate-drive voltage that may be 10 V above its source potential. In the example illustrated in FIG. 5, the gate-drive voltage is provided by the safety FET driver 526 on the same ASIC chip as the firing stages. This does not provide optimal isolation because a fault that corrupts the main firing path might also affect the driver of the safety FET.

Figure 6:
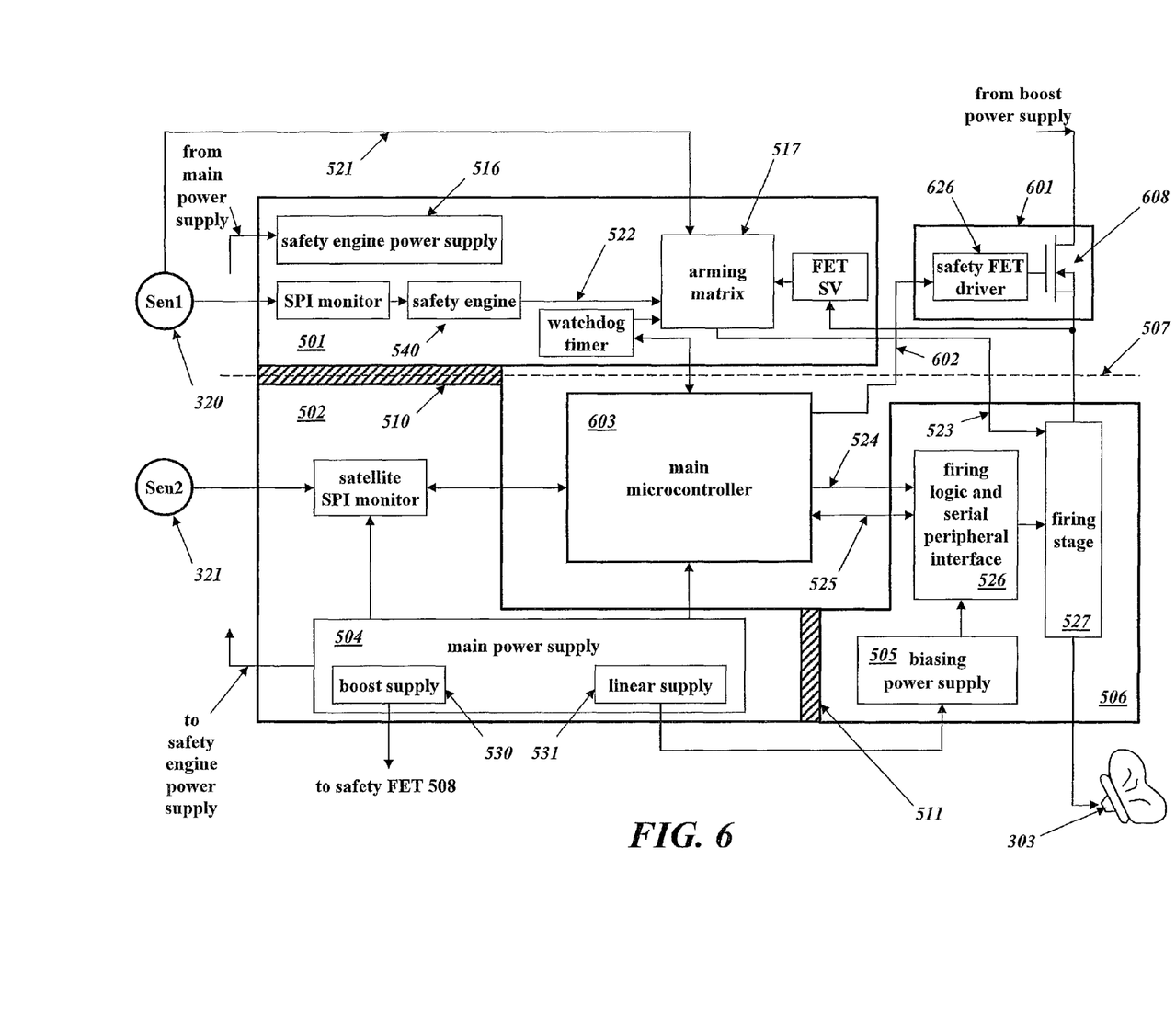
FIG. 6 illustrates a block diagram of an airbag actuator system formed with several silicon devices, wherein a main microcontroller has a direct communication path with a safety FET that does not lie on a partitioned selection device, providing an environment for application of the invention.
Figure 7:
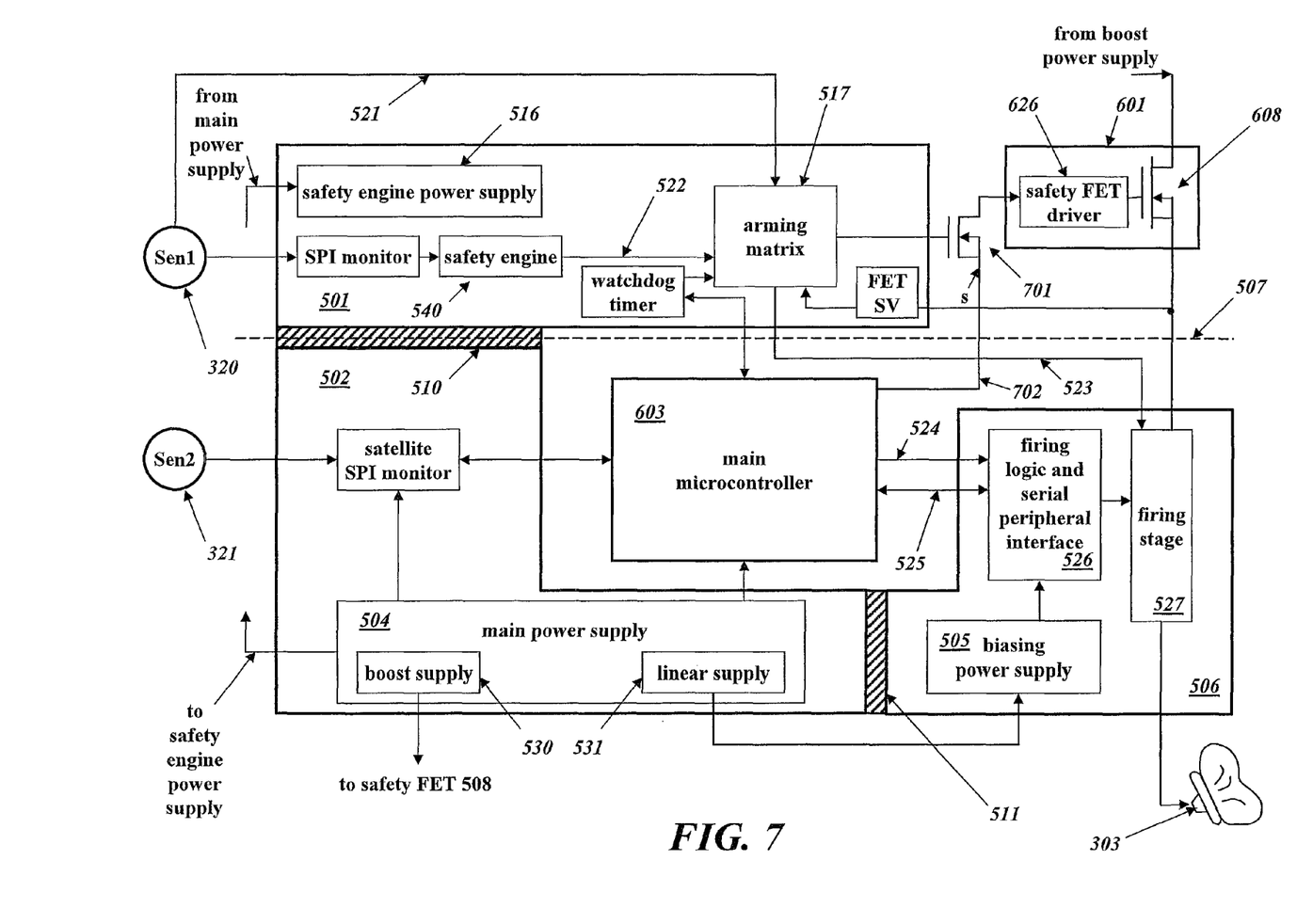
FIG. 7 illustrates a further block diagram of an airbag actuator system formed with several silicon devices wherein a main microcontroller has a direct communication path with a safety FET that does not lie on the partitioned selection device, providing a further environment for application of the invention.

A level of functional isolation between the main firing path and the safety-firing path may be achieved by a layout of the integrated circuit that provides a separation distance between critical blocks in the integrated circuit, indicated by the separation regions 510 and 511 in FIGS. 5, 6, and 7. Nonetheless, the common error path between the safety-firing path and the main firing path is improved but not completely removed due to their formation on the same substrate with a common power supply.

It is important in the design of systems that require a high SIL that the signal-processing elements do not contain a common element that could induce a common failure mode. For example, it is important that a high voltage produced by a bias voltage power source not induce a common failure that could enable operation of the actuator. For example, a switch signal could be stuck "high" due to a circuit failure, or even an oscillatory behavior of a switch signal could be induced by a circuit failure.

Despite the multi-path squib firing system illustrated in FIG. 5, common cause factors related to temperature and integration on a common silicon chip still remain.

A common cause factor present on the circuit illustrated in FIG. 5 can be reduced by providing a signaling path for the safety FET 508 that is routed on a different silicon chip than the main firing path. This can be achieved by directly controlling the safety FET by the microcontroller 503, and forming the gate driver on the same silicon die as the safety FET. This moves the safety FET into the main firing path and away from the safety path which is now completely on the main firing IC, i.e., on partition 506. An advantage is in case of a catastrophic malfunction of the main firing IC, the safety FET still retains a level of independence. As long as the IC is working properly, it is not a disadvantage because the safety path will disable the integrated firing path.

Turning now to FIG. 6, illustrated is a block diagram of an airbag actuator system formed with several silicon devices wherein main microcontroller 603 now has a direct communication path 602 with safety FET 608 that does not lie on the partitioned ASIC. FIG. 6 provides an environment for application of the principles of the invention. This arrangement prevents activation of the safety FET 608 as long as the system ASIC is still working. This is achieved by building a second one-out-of-two path to control the safety FET 608. The safety FET 608 and the safety FET driver 626 are formed in a separate high-side switch device 601. This prevents activation of the safety FET 608 as long as no firing decision is taken by the main microcontroller 603. Nonetheless, it is still only a one-out-of-two path, the main path including sensor 321, main microcontroller 603, the integrated firing stage (506, 526, 527), and safety FET 608.

The other path includes the on-board sensor, e.g., 320, the integrated safety engine 501, including an enabling function (arming matrix) 517, e.g., for the high side of the integrated firing stage. An exemplary commercial product for the separate high-side switch device 601 is the Infineon PROFET, which provides a simple "one-bit" interface with the main microcontroller 603. The main microcontroller 603 evaluates the sensor signal produced by sensor Sen2, 321, and does not activate the safety FET 608 if sensor Sen2 gives no indication of an impact. Even if the whole ASIC would fail in a worst-case situation, as long as the main microcontroller 603 is operative it will not activate the safety FET 608. As long as the ASIC is operable, the main microcontroller 603 may fail without firing the squib because the arming matrix 517 in the safety-firing path will not allow activation of the main firing stage 527. Nonetheless, the power supply system that supplies both the main microcontroller 603 and the partitioned ASIC remains as a common cause factor for an unintended actuation of the airbag squib.

Turning now to FIG. 7, illustrated is a further block diagram of an airbag actuator system formed with several silicon devices wherein main microcontroller 603 has a direct communication path 702 with safety FET 608 that does not lie on the partitioned ASIC. FIG. 7 provides a further environment for application of the principles of the invention. A small NMOS FET 701 is now added as a source follower between the outputs of the arming matrix 517 and the main microcontroller 603 and the input to the safety FET driver 626. The NMOS FET 701 provides a logical AND process to enable safety FET 608 to conduct, e.g., a serial connection in the enable path of the safety FET that performs a logical AND function. The source of NMOS FET 701 is identified with the letter "s" in FIG. 7. If the arming matrix 517 produces a high signal for the gate of NMOS FET 701, then a low signal produced by an open drain pin of main microcontroller 603 on line 702 will turn on safety FET 608.

Thus, the source follower formed with NMOS FET 701 pinches off the open drain of the main microcontroller 603 on lead 702 to avoid activation of the safety path if the safety signal produced by arming matrix 517 does not confirm the firing command. If the safety path is activated, the gate of the source follower 701 can be pulled to a low voltage level and function as a cascade circuit element for a source follower in the microcontroller, providing additional protection of the microcontroller against high voltage levels. The NMOS source follower 701 could also be integrated in the system ASIC, thereby providing a further mechanism for protection against faulty squib activation.

The power supply persists as a common cause factor providing a remaining drawback to independent squib firing paths in the system illustrated in FIGS. 6 and 7 (and FIG. 5). If the power supply produces an overvoltage condition, such condition may damage the ASIC and the microcontroller, and the protective signal produced by the main microcontroller 603 on line 602 or 702 may be pulled up or down by a defective output device or electrostatic discharge ("ESD") structure. A PROFET® is activated if its IN pin is pulled to local circuit ground or to a voltage level that is low enough below the power supply pin supplying the safety FET, especially if this pin is pulled up due to a failure or ESD event.

To avoid faulty activation of the safety FET 608, the activation signals 602, 702 from the microcontroller, illustrated, respectively, in FIGS. 6 and 7, are formed with a characteristic that is not likely to be generated by a defective microcontroller, especially if there is substantial device damage due to an overvoltage or ESD event.

Figure 8:
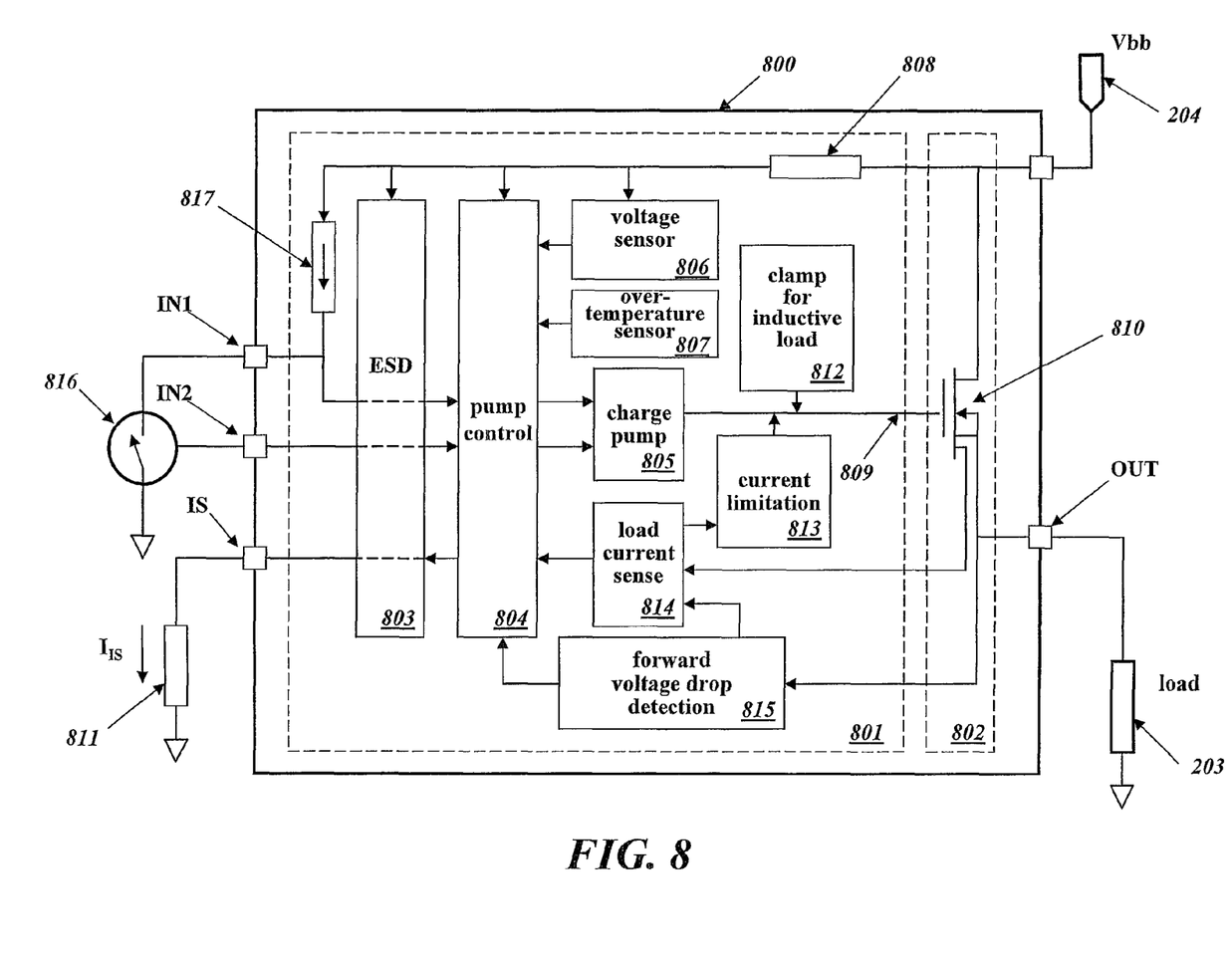
FIG. 8 illustrates a block diagram of an integrated high-side switch device including an NMOS power MOSFET responsive to a ground-referenced logic-level input signal coupled to an input pin and to an externally produced clock signal, constructed according to an embodiment.

Turning now to FIG. 8, illustrated is a block diagram of an integrated high-side switch device 800, including an NMOS power MOSFET 810 responsive to a ground-referenced logic-level input signal coupled to input pin IN1, constructed according to an embodiment. The NMOS power MOSFET 810 may be employed as a high-side safety switch in safety-related systems, for example, as illustrated in FIGS. 6 and 7. The integrated high-side switch device 800 is further responsive to a clocking signal produced by an external signal source coupled to input pin IN2. The high-side switch device 800, employable as a safety switch, is formed with logic integrated circuit 801 that contains low-power circuit elements coupled to base chip 802. The NMOS power MOSFET 810 is formed on the base chip 802.

A bias voltage source 204 provides a bias voltage Vbb to the high-side switch device 800. Resistor 808 is included to provide a voltage-dropping circuit element to supply a lower bias voltage to other circuit elements in the high-side switch device. A pull-up device, typically a current source, e.g., current source 817, or a resistor is coupled between the bias voltage source 204 and the input pin IN1. A pull-up device, e.g., a current source or a resistor coupled to a bias voltage source, not shown, is also needed for input pin IN2 because it too is a low voltage open-drain signal which is typically produced by a microcontroller similar to that for input pin IN1. The source of NMOS power MOSFET 810 is coupled to output pin OUT, which may be coupled to a grounded load such as load 203. The grounded load 203 represents a process that requires safety protection such as the firing stage 527 illustrated and described with reference to FIGS. 5, 6, and 7.

Input signals coupled to pins IN1 and IN2 are protected in high-side switch device 800 by electrostatic discharge ("ESD") block 803 formed with conventional ESD protection devices such as Zener diodes. After the ESD block 803, the input signals are routed to pump control block 804. An example of a complex input signal coupled to input pin IN1 is a high-frequency ac waveform.

In one embodiment, only one pin (IN1) is employed to activate high-side switch device 800, and the clocking signal is provided via this pin. Whenever the clocking frequency is sufficiently high, the gate source voltage is high enough to turn on the high-side MOSFET 810. This should be checked by a comparator to disconnect the pump voltage from the MOSFET gate if it is too low to turn on securely the high-side NMOS power MOSFET 810 with a sufficiently low on resistance. This is supported further by adding a load resistance or discharge current source to the charge pump output 809, which can be used to set a minimum pump frequency to achieve the required gate voltage to turn the high-side MOSFET 810 on. To increase selectivity, a band-pass screening process can be used, for example, to prevent operation with a clocking with an out-of-specification frequency. This is an example of an analog implementation of a selective circuit. This need not necessarily be employed if one of the following embodiments is used.

In one embodiment, the validity of the clocking signal is checked before activating the high-side power MOSFET 810 by measuring the time period of the transmitted signal compared to an internal resistor-capacitor time constant, and disabling the charge pump if the time period is outside a defined tolerance.

In one embodiment, to achieve good selectivity before activating the high-side NMOS power MOSFET 810 a clocking pulse pattern is checked. A pattern of a series of clocking pulses is compared to a reference pattern. This can be used, for example, with rising edges for the clocking signal by varying the length of the high period with a reference pattern, e.g., short, long, short, long, . . . . The charge pump is only enabled and operated with a received derived clocking frequency if the pattern is recognized. The advantage of this embodiment is that it is very unlikely that a particular reference pattern would be generated by an output signal of a defective microcontroller.

The use of two pins such as IN1 and IN2 allows detection of patterns that are synchronized to the clocking signal that is also used for the charge pump. This makes detection simpler and allows an increase of reference pattern complexity that can be detected without increasing hardware complexity.

Of course, combinations of the embodiments above may be employed as well.

Pump control block 804 includes a band-pass filter tuned to the frequency of the ac waveform coupled to input pin IN1. Pump control block 804 enables operation of the charge pump block 805 that is formed with a charge-pump circuit but without an internal oscillator to produce a high-frequency signal necessary for charge pump operation. The charge pump block 805 produces the gate signal 809 for NMOS power MOSFET 810. Thus, conductivity of power MOSFET 810 is dependent on operation of charge pump block 805, which in turn is dependent on the clocking signal produced by the external signal source coupled to input pin IN2 as well as presence of the complex input signal coupled to input pin IN1.

The gate signal 809 for power MOSFET 810 may be clamped to protect the power MOSFET from inductive spikes. The block 812 illustrated in FIG. 8 includes circuit elements such as Zener diodes to provide a protective clamping function for the gate of power MOSFET 810. Of course, pump control block 804 and charge pump block 805 can be formed as a single functional block.

The logic-level input signal coupled to input pin IN1 provides the complex signal input waveform as introduced herein that grounds the input pin IN to enable conduction of the power MOSFET. Absence or incorrect production of the complex input signal disallows conduction of the safety power MOSFET 810. The input signal coupled to input pin IN1 is filtered by a band-pass filter included in pump control 804. Alternatively, the input signal is compared to a reference signal pattern before charge-pump activation. Filtering the signal with a band-pass filter responsive to a narrow range of frequencies substantially avoids charge-pump activation by a random oscillation applied to the input pin IN1. Application of the complex input signal coupled to input pin IN1, illustrated in FIG. 8 by input signal source 816, can be accomplished with an open-drain microcontroller output pin.

Operation of the charge pump is thus performed by an oscillator located separate from the high-side safety switch device 800 that produces the clocking signal coupled to input pin IN2. An internal charge-pump oscillator is thus replaced with a clocking signal that is provided from an external input. Two safety advantages are thereby created. The first advantage is that a stuck signal at the input pin IN1 has no effect, because the charge pump can only create a voltage higher than the supply voltage Vbb if a clocking signal is available to enable operation of the charge pump. The second advantage is that since there is no internal clocking signal to drive the charge pump in the integrated high-side switch device 800, no fault of the high-side switch device 800 can erroneously connect a clocking signal to the charge pump with the exception of a source-to-drain short of the NMOS power switch 810.

Further safety precautions can be realized by adding additional restrictions to the characteristic of the input signal coupled to the input pin IN1. The edges of the input signal applied to input pin IN1 can be counted during a time window, and the charge pump can be activated only if the count falls between defined minimum and maximum values. The protective effect is similar to that achieved with the band-pass filter, but can be more accurately executed.

The pump control block 804 may include a receiver that employs a protocol that simultaneously transmits the clocking signal for the charge pump and the enabling signal coupled to the input pin IN1. For example, self-clocking Manchester-encoded signals or PSK-encoded (phase-shift keyed) signals may be employed. Activation of the charge pump requires a pre-defined command in addition to the clocking signal. This process described can also be achieved by using two inputs, one for the data signal and one for the clocking signal, as illustrated by the pins IN1 and IN2 in FIG. 8.

Further system protection can be provided within the broad scope of the present invention employing additional inputs to be activated to enable operation of the charge pump.

The high-side switch device 800 may be formed with further circuit elements and enhancements to provide a higher level of functionality. For example, the current conducted through the NMOS power safety switch 810 may be sensed in forward voltage drop detection block 815, which can provide internal protective signals to pump control block 804 and load current sense block 814. For example if load current sense block 814 detects a current level in power safety switch 810, a current limitation block 813 can be employed to clamp the gate of power safety switch 810 low, thereby disabling its conductivity. The sensed load current can be coupled to an output pin such as the output pin IS to provide an indication of load current to the system. The output pin IS can supply a current $I_{IS}$ proportional to the load current to a resistor, such as the resistor 811 illustrated in FIG. 8.

A voltage sensor block 806 and an over-temperature sensor block 807 may be employed to disable operation of the high-side switch device 800 if a voltage level or a sensed temperature, such as a temperature of the safety switch 810, exceeds a threshold level.

Thus, an integrated high-side switch device has been introduced that may be employed in a safety-related application such as for a safety switch in an airbag ECU architecture. In accordance with an embodiment, the high-side switch device includes a semiconductor switch, and a charge pump operable in response to an external clocking signal. An input for an external charge pump activation signal is provided for the charge pump. The charge pump is configured to enable conductivity of the semiconductor switch in response to the external clocking signal and assertion of the external charge pump activation signal.

In an embodiment, the external clocking signal is coupled to the input for the external charge pump activation signal. In a further embodiment, a current source is coupled to the input for the external charge pump activation signal. In an embodiment, the charge pump requires the external charge pump activation signal to satisfy an activation code prior to enabling conductivity of the semiconductor switch. In an embodiment, the activation code is a Manchester code.

In an embodiment, the charge pump requires an internal charge pump voltage to exceed a threshold voltage level prior to enabling conductivity of the semiconductor switch. In an embodiment, the charge pump includes a circuit to prevent a charge pump voltage from reaching a conductivity threshold of the semiconductor switch if a frequency of the external clocking signal is less than a frequency threshold. In a further embodiment, a band-pass filter tuned to a frequency of the external clocking signal is inserted between the external clocking signal and an input of the charge pump.

In an embodiment, the semiconductor switch is a metal-oxide semiconductor field-effect transistor. In an embodiment, edges of the external charge pump activation signal are counted during a time window, and the count of the edges must fall between defined minimum maximum values prior to the enabling the conductivity of the semiconductor switch. In a further embodiment, a forward voltage drop detection circuit is configured to detect a current level in the semiconductor switch, and conductivity of the semiconductor switch is disabled by the forward voltage drop detection circuit upon detection of a current level greater than a threshold level.

In an embodiment, a signal indicative of the current level is coupled to a high-side switch device output node. In a further embodiment, at least one of a voltage sensor block and an over-temperature sensor block is configured to disable conductivity of the semiconductor switch if a sensed voltage and/or a sensed temperature exceeds a respective threshold level.

Another exemplary embodiment provides of method of enabling conductivity of a semiconductor switch with a charge pump that is operated from an external clocking signal. In an embodiment, the method includes receiving the external clocking signal, receiving an external charge pump activation signal for the charge pump, and enabling conductivity of the semiconductor switch in response to the received external clocking signal and the external charge pump activation signal.

In an embodiment, the method further includes receiving the external clocking signal and the external charge pump activation signal at the same input. In an embodiment, the method further includes requiring the external charge pump activation signal to satisfy an activation code prior to enabling conductivity of the semiconductor switch. In an embodiment, the method further includes requiring an internal charge pump voltage to exceed a threshold voltage level prior to enabling conductivity of the semiconductor switch.

In an embodiment, the method further includes counting edges of the external charge pump activation signal during a time window, and requiring the count of the edges to fall between defined minimum and maximum values prior to enabling the conductivity of the semiconductor switch. In an embodiment, the method further includes detecting a current level in the semiconductor switch, and disabling conductivity of the semiconductor switch upon detection of a current level greater than a threshold level. In an embodiment, the method further includes disabling conductivity of the semiconductor switch if a sensed voltage and/or a sensed temperature of the charge pump and/or the semiconductor switch exceeds a respective threshold level.

Another exemplary embodiment provides a squib actuation device including a main firing circuit formed with a first sensor, and a safety firing circuit formed with a second sensor. The squib actuation device further includes a high-side switch device formed with a semiconductor switch, a charge pump operable in response to a clocking signal external to the high-side switch device, and an input to the high-side switch device for a charge pump activation signal external to the high-side switch device. The charge pump is configured to enable conductivity of the semiconductor switch in response to the external clocking signal and assertion of the external charge pump activation signal. In a further embodiment, the squib actuation device includes a squib electrically coupled in series with the main firing circuit and the safety firing circuit, and an airbag assembly positioned adjacent to the squib so that the squib, upon being fired, can operate the airbag assembly.

Although processes to control an actuator switch in a safety-related application and related methods have been described for application in an automotive environment, it should be understood that other applications of these processes such as for other vehicular as well as stationary safety-related applications are contemplated within the broad scope of the invention, need not be limited to automotive safety-related applications employing processes introduced herein.

Although the invention has been shown and described primarily in connection with specific exemplary embodiments, it should be understood by those skilled in the art that diverse changes in the configuration and the details thereof can be made without departing from the essence and scope of the invention as defined by the claims below. The scope of the invention is therefore determined by the appended claims, and the intention is for all alterations that lie within the range of the meaning and the range of equivalence of the claims to be encompassed by the claims.

What is claimed is:

1. A high-side switch device, comprising:
    a semiconductor switch;
    a charge pump operable in response to an external clocking signal; and
    an input for an external charge pump activation signal, wherein the charge pump is configured to enable conductivity of the semiconductor switch in response to the external clocking signal and assertion of the external charge pump activation signal, wherein the external clocking signal is a first signal, the external charge pump activation signal is a second signal different from the first signal, and the charge pump requires an activation code prior to the enabling the conductivity of the semiconductor switch.

2. The high-side switch device as claimed in claim 1, further comprising a current source coupled to the input for the external charge pump activation signal.

3. The high-side switch device as claimed in claim 1, wherein the external charge pump activation signal is configured to provide the activation code.

4. The high-side switch device as claimed in claim 1, wherein an internal charge pump voltage must exceed a threshold voltage level prior to the charge pump enabling the conductivity of the semiconductor switch.

5. The high-side switch device as claimed in claim 1, wherein the charge pump comprises a circuit to prevent a charge pump voltage from reaching a conductivity threshold of the semiconductor switch if a frequency of the external clocking signal is less than a frequency threshold.

6. The high-side switch device as claimed in claim 1, wherein the semiconductor switch comprises a metal-oxide semiconductor field-effect transistor.

7. The high-side switch device as claimed in claim 1, further comprising a circuit to count edges of the external charge pump activation signal during a time window, wherein the circuit is configured to enable the conductivity of the semiconductor switch when the count of the edges falls between defined minimum and maximum values.

8. The high-side switch device as claimed in claim 1, further comprising a forward voltage drop detection circuit configured to detect a current level in the semiconductor switch, wherein the forward voltage drop detection circuit is configured to disable conductivity of the semiconductor switch upon detection of a current level greater than a threshold level.

9. The high-side switch device as claimed in claim 8, wherein a signal indicative of the current level is coupled to a high-side switch device output node.

10. The high-side switch device as claimed in claim 1, further comprising a voltage sensor block and/or an over-temperature sensor block configured to disable conductivity of the semiconductor switch if a sensed voltage or a sensed temperature exceeds a respective threshold level.

11. A method of enabling conductivity of a semiconductor switch with a charge pump that is operated from an external clocking signal, the method comprising:
receiving the external clocking signal;
receiving an external charge pump activation signal for the charge pump; and
enabling conductivity of the semiconductor switch in response to both the received external clocking signal and the external charge pump activation signal, wherein the external clocking signal is a first signal, the external charge pump activation signal is a second signal different from the first signal, and the charge pump requires an activation code prior to the enabling the conductivity of the semiconductor switch.

12. The method as claimed in claim 11, further comprising enabling the conductivity of the semiconductor switch only when an internal charge pump voltage exceeds a threshold voltage level.

13. The method as claimed in claim 11, further comprising:
detecting a current level in the semiconductor switch; and
disabling the conductivity of the semiconductor switch upon detecting that the current level is greater than a threshold level.

14. The method as claimed in claim 11, further comprising disabling the conductivity of the semiconductor switch if a sensed voltage and/or a sensed temperature of the charge pump and/or the semiconductor switch exceeds a respective threshold level.

15. The method of claim 11, wherein the external charge pump activation signal is configured to provide the activation code.

16. A squib actuation device, comprising:
a main firing circuit comprising a first sensor;
a safety firing circuit comprising a second sensor; and
a high-side switch device, comprising
a semiconductor switch,
a charge pump operable in response to a clocking signal external to the high-side switch device, and
an input to the high-side switch device for a charge pump activation signal external to the high-side switch device, wherein the charge pump is configured to enable conductivity of the semiconductor switch in response to the external clocking signal and assertion of the external charge pump activation signal.

17. The squib actuation device as claimed in claim 16, further comprising:
a squib electrically coupled in series with the main firing circuit and the safety firing circuit; and
an airbag assembly positioned adjacent to the squib.

18. The squib actuation device as claimed in claim 16, wherein the external clocking signal is a first signal, and the external charge pump activation signal is a second signal different from the first signal.

19. A high-side switch device, comprising:
a semiconductor switch;
a charge pump operable in response to an external clocking signal; and
an input for an external charge pump activation signal, wherein the charge pump is configured to enable conductivity of the semiconductor switch in response to the external clocking signal and assertion of the external charge pump activation signal, wherein the charge pump requires the charge pump activation signal to satisfy an activation pattern prior to the enabling the conductivity of the semiconductor switch.

20. The high-side switch device as claimed in claim 19, wherein the external clocking signal is coupled to the input for the external charge pump activation signal.

21. The high-side switch device as claimed in claim 19, further comprising a band-pass filter tuned to a frequency of the external clocking signal and inserted between the external clocking signal and an input of the charge pump.

22. The high-side switch as claimed in claim 19, wherein the activation pattern comprises varying a length of a high period of the charge pump activation signal with a reference pattern.

23. The high-side switch as claimed in of claim 19, wherein the activation pattern comprises an edge count within a time window.

24. The high-side switch as claimed in claim 19, wherein the activation pattern comprises an activation code.

25. The high-side switch as claimed in claim 19, wherein the activation pattern comprises a Manchester code.

26. The high-side switch device as claimed in claim 19, wherein the external clocking signal is a first signal, and the external charge pump activation signal is a second signal different from the first signal.

27. A method of enabling conductivity of a semiconductor switch with a charge pump that is operated from an external clocking signal, the method comprising:
receiving the external clocking signal;
receiving an external charge pump activation signal for the charge pump; and
enabling conductivity of the semiconductor switch in response to both the received external clocking signal and the external charge pump activation signal only when the external charge pump activation signal satisfies an activation pattern.

28. The method as claimed in claim 27, further comprising receiving the external clocking signal and the external charge pump activation signal at a same input.

29. The method as claimed in claim 27, wherein the activation pattern comprises an edge count within a time window.

30. The method as claimed in claim 29, further comprising:
counting edges of the external charge pump activation signal during the time window;
and enabling the conductivity of the semiconductor switch when the count of the edges falls between defined minimum and maximum values.

31. The method as claimed in claim 27, wherein the activation pattern comprises an activation code.

32. The method as claimed in claim 27, wherein the external clocking signal is a first signal, and the external charge pump activation signal is a second signal different from the first signal.

* * * * *